United States Patent [19]

Horwinski

[11] 4,042,056

[45] Aug. 16, 1977

[54] HYBRID POWERED AUTOMOBILE

[75] Inventor: Elwood R. Horwinski, Cheshire, Conn.

[73] Assignee: Automobile Corporation of America, New Haven, Conn.

[21] Appl. No.: 634,263

[22] Filed: Nov. 21, 1975

[51] Int. Cl.$^2$ .................. B60L 11/12; B60L 11/14
[52] U.S. Cl. ...................... 180/65 A; 180/44 M; 290/13; 290/16; 310/83
[58] Field of Search ............... 180/65 A, 65 R, 68.5, 180/44 E, 44 M, 54 R, 54 C; 290/9, 10, 11, 12, 13, 14, 15, 16, 17, 18, 19, 45, 50; 192/.033; 310/83

[56] References Cited

U.S. PATENT DOCUMENTS

| 583,104 | 5/1897 | Wattles | 290/9 X |
|---|---|---|---|
| 1,165,418 | 12/1915 | Kerr | 290/50 X |
| 1,705,673 | 3/1929 | Menzies | 290/50 |
| 1,790,634 | 1/1931 | Arendt | 180/65 R X |
| 2,244,216 | 6/1941 | Pieper | 180/54 C |
| 3,202,234 | 8/1965 | Osborne | 180/65 R |
| 3,352,373 | 11/1967 | Tuck | 180/65 A X |
| 3,650,345 | 3/1972 | Yardney | 180/65 A |
| 3,861,485 | 1/1975 | Busch | 310/83 |
| 3,904,883 | 9/1975 | Horwinski | 290/50 |

Primary Examiner—Joseph F. Peters, Jr.
Assistant Examiner—Milton L. Smith
Attorney, Agent, or Firm—H. Gibner Lehmann; K. Gibner Lehmann

[57] ABSTRACT

A gasoline and battery-powered electric automobile wherein the start and the running of the car are effected by an electric motor except in circumstances where the battery charge is depleted, in which case the normal cruising and higher speeds are then obtained using a gasoline or internal combustion engine which can be cut in either automatically or at will. The electric motor is powered by storage batteries that can be recharged from a generator driven by the internal combustion engine, or else from house current. One pair of wheels of the vehicle is powered by the internal combustion engine through a magnetic clutch and differential. The other set of wheels is powered through an infinitely variable mechanical transmission comprising cone pulleys or cone chains whose ratio is power-controlled in accordance with the driver's desires or else with the speed of the vehicle. The infinitely variable transmission has a very high speed-ratio for starting the vehicle, after which the speed ratio reduces either automatically or under the driver's direction as the vehicle gains speed. In cases where the battery charge is, say, below one half of the fully-charged condition, the car upon attainment of a predetermined cruising speed will discontinue driving of the electric powered means, and this can be replaced by the internal combustion engine. Thus, with the arrangement disclosed, city driving can be characterized by the use of electrical power whereby air pollution is nil. Only minimal polluting exhaust occurs for higher speed driving, as along highways and the like, in those cases wherein the battery charge is below one half.

6 Claims, 2 Drawing Figures

HYBRID POWERED AUTOMOBILE

CROSS REFERENCES TO RELATED PATENTS

U.S. Pat. No. 3,904,883 in the name of Elwood R. Horwinski, dated Sept. 9, 1975 and entitled LOW OR ZERO POLLUTION HYBRID ENERGY CONVERTER AND TRANSMISSION UNIT.

BACKGROUND

This invention relates to automotive vehicles which are arranged to be powered by electrical energy and also energy from internal combustion engines, and more particularly to such vehicles wherein the drive can be provided either by electric motors energized from batteries, or else by gasoline or similar engines, or both.

Heretofore there have been numerous proposals for eliminating the pollution caused by automobiles driven by internal combustion engines. All-electric cars and trucks were produced and used many years ago, these being powered by electric motors connected with storage batteries that were periodically recharged. More recently, various more sophisticated types of cars have been proposed and produced, utilizing electric power that is supplemented by internal combustion engines. In many such cases the recharging of the batteries was done by a generator driven by the internal combustion engine. In some of these prior hybrid-power automobiles the internal combustion engine was also utilized for driving purposes, being coupled to the rear wheels through a transmission which was likewise utilized in whole or in part to carry the power of the electric motor drive.

In my issued patent above identified there is disclosed and claimed a hybrid-powered unit for driving automobiles, wherein one and the same electrical machine is used as the driving motor and also as the generator for recharging the batteries. For the latter use the electrical machine is mechanically driven by the internal combustion engine.

The usual procedure, where electrical drives are incorporated, is to use a series-type motor which has a desirably high starting torque. While this is of great advantage, it entails very high starting currents which give rise to difficulties of control. Moreover, the extremely high starting currents necessitate oversized equipment, including brushes, commutator, magnet iron, copper conductors and the like. These prior arrangements all contemplated power transmission between the electric motor and the wheels, which were incapable of extremely high ratios and ranges. Thus the large size and weight of the electric power equipment, and the complexity of the current control devices for the electric motor constituted severe drawbacks which prevented widespread adoption of electric vehicle power. Moreover, in most cases the use of electric power did not in itself have a capability of higher vehicle speeds.

SUMMARY

The above disadvantages and drawbacks of prior hybrid-powered automotive vehicles are obviated by the present invention, which has for its main object the provision of an improved hybrid vehicle power system involving both an electric motor and an internal combustion engine, wherein excessively and abnormally high starting currents are eliminated by use in the system of a simplified power transmission having an exceptionally high speed ratio and range. A related object of the invention is the provision of an improved electric power drive for a hybrid-energy vehicle as above, wherein the speed ratio of the transmission can be varied either at will or else automatically between wide limits in response to acceleration of the vehicle. A further object of the invention is to provide an improved hybrid-powered vehicle in accordance with the foregoing, wherein the power requirements after electrical start-up and acceleration can be taken over by the internal combustion engine in those cases where the battery is less than half charged; in such event the electric drive may be reduced to the point that it eliminates the drag of the electric motor in response to the vehicle attaining a predetermined cruising speed, as for example 20 miles per hour.

The current applied to the motor may be varied by the throttle which can increase the speed of the electric drive, or inversely. When the foot is removed from the throttle, it will give regeneration braking wherein the drive motor acts as a generator and the excess current is returned to the battery.

Still another object of the invention is to provide an improved hybrid-powered vehicle as above set forth, wherein the transmission will automatically down-shift in response to a build-up of motor current, as when a hill is encountered, or additional loading.

The above objects are accomplished by the provision of an internal combustion engine and power transmission having means for connecting the same to one set of wheels of a vehicle, in conjunction with batteries and an electric motor energized therefrom wherein the latter is coupled through a unique variable speed transmission to another set of wheels of the vehicle. The electric motor and variable speed transmission are arranged, in conjunction with control circuitry, to effect the starting and running of the vehicle at both its slower and higher speeds when the battery is more than 1/2 charged, whereas the internal combustion engine is adapted to take over and operate the vehicle at predetermined higher speeds in those circumstances where the battery is less than 1/2 charged. Charging of the batteries is normally effected by the use of commercial electricity, but may also be effected by the generator powered from the internal combustion engine, while in motion or stationary. The engine is preferably coupled for driving the vehicle through a clutch, which advantageously can be of the magnetic type. The ratio of the variable transmission coupled to the electric motor can be varied at will by a foot throttle, or else automatically changed in response to changes in the speed of the vehicle for the low range, and provision is made whereby the starting and running currents fed to the motor are kept within safe, readily-controlled limits.

The foot throttle is also connected to the carburetor of the internal combustion engine so as to be able to vary the speed of the vehicle at the will of the operator when operating on internal combustion drive or combined internal combustion and electric. The internal combustion engine's minimum speed will equal the speed of cut over from electric to internal combustion, and may then increase the speed of the vehicle as the operator desires. In the illustrated embodiment of the invention the variable transmission coupled to the electric motor comprises cone pulleys operating with a belt or chain, and the pulley ratios are changed by a hydraulic or air or other unit which can be electrically controlled either by the values of the current which energize the electric motor or the position of the foot throttle.

Features of the invention reside in the provision of an improved hybrid-vehicle drive, wherein one set of wheels is powered by the internal combustion engine whereas the other set of wheels is powered by the electric motor, to the end that extreme simplicity is achieved and a correlation can be had between the internal combustion engine power and the electric motor power.

Still other features of the invention reside in the simplicity of the electrical control devices for controlling the power to the electric motor, and simplicity of the mechanical transmission receiving power from the electric motor.

Yet other features and advantages will hereinafter appear.

Figure 1:
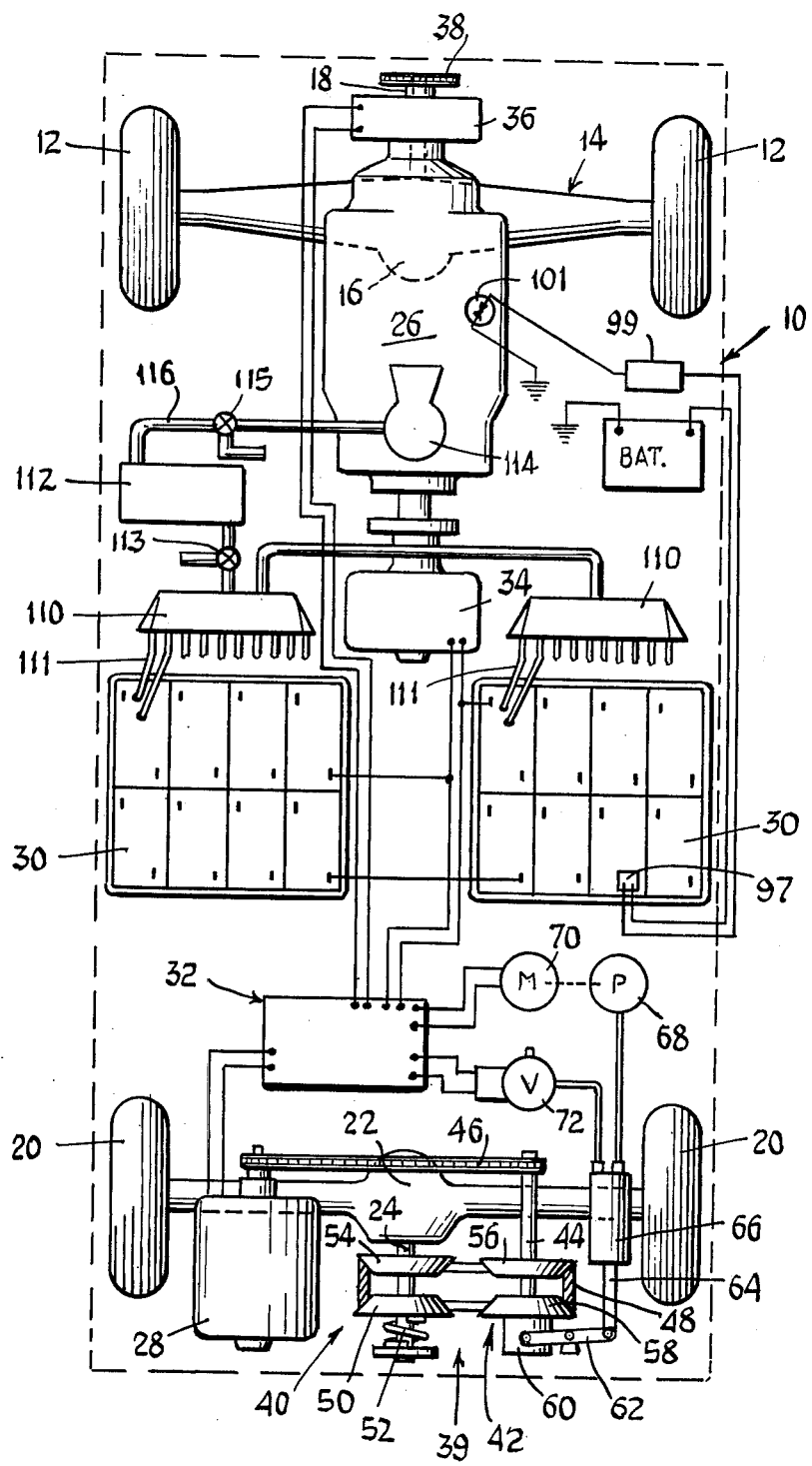
FIG. 1 is a diagrammatic representation of a vehicle equipped with the improved hybrid power system of the invention.

As shown in FIG. 1, the improved vehicle and hybrid-power system therefor comprises a usual type of chassis 10 which is illustrated diagrammatically in the figure by a broken rectangular outline. The vehicle has front wheels 12 connected to a front wheel drive system 14 including a differential 16 having a drive shaft 18. At its rear the vehicle has wheels 20 connected with a differential or rear-end assemblage 22 which has a drive shaft 24.

The power units of the vehicle comprise an internal combustion engine 26 carried on the front portion of the chassis 10, and an electric motor 28 carried on the rear portion of the chassis 10.

Intermediate the front and rear chassis portions are batteries 30 of the rechargeable type, adapted to supply power to the motor 28 through an automatic control device 32.

In accordance with the present invention the internal combustion engine 26 is arranged to supply power to one set of wheels of the vehicle whereas the electric motor 28 is arranged to supply power to the other set of vehicle wheels. As shown, the engine 26 drives the front wheels 12 and the motor 28 drives the rear wheels 20.

With such arrangement there is had a simple and effective power coupling between the engine 26 and the motor 28, this by means of the wheels 12, 20 and the surface over which the vehicle is traveling. It will be understood that the torque of the motor 28 can be additive with respect to the torque of the engine 26, and vice versa.

The internal combustion engine 26 is connected to drive an electric generator 34 which is adapted to recharge the batteries 30 through suitable circuitry having a cut-out 29 and controls, and to supply energy, as well, to the motor 28 for driving the latter. The batteries 30 can be recharged by means of a charger 31, from commercial house current, this being generally the preferred procedure.

In the illustrated embodiment of the invention the engine 26 is connected to a magnetic clutch 36 which is coupled to the front drive shaft 18 by means of a chain drive 38. Accordingly, the engine 26 can propel the vehicle by means of a front wheel drive arrangement, when the clutch 36 is engaged. Simultaneously, the engine 26 can power the generator 34 to effect recharging of the batteries 30 or drive the motor 28, or both as will now be understood.

In accordance with the invention, the electric motor 28 is connected to power the rear wheels 20 through a unique automatic transmission 39 which has an extremely high speed-change ratio and which can provide a step-down speed from the motor to the wheels of such magnitude that the starting current for the motor is not abnormally or excessively high but instead can be kept within practical and safe limits. At the same time, as the starting load on the motor 28 decreases, the transmission will automatically vary in its ratio so as to utilize to the best extent the motor torque for acceleration of the vehicle.

In the embodiment of the invention illustrated herein the automatic transmission 39 coupled to the motor 28 comprises sets of cone pulleys 40, 42 the latter of which is carried on a shaft 44 connected by a chain drive 46 to the motor 28. A drive belt 48 passes around the sets of pulleys 40, 42 to transfer power between them. The pulley set 40 is carried on the rear drive shaft 24 of the vehicle, and comprises a pulley half 50 which is biased by means of a coil spring 52 toward the companion pulley half 54. It will be understood that the pulley half 50 is keyed to the shaft 24 but can slide thereon, whereas the pulley half 54 is rigid on the shaft 24.

With respect to the set of pulleys 42, a pulley half 56 is rigid on the shaft 44 and a pulley half 58 is splined to and slidable on the shaft 44, being shiftable by a collar 60 connected to levers 62 which in turn are actuated by a plunger 64 of a hydraulic cylinder unit 66 associated with a reservoir 67.

The hydraulic cylinder unit 66 is powered by a pump 68 driven from an electric motor 70, and is connected with a bleeder valve 72 by which drive pressure in the cylinder can be relieved.

Figure 2:
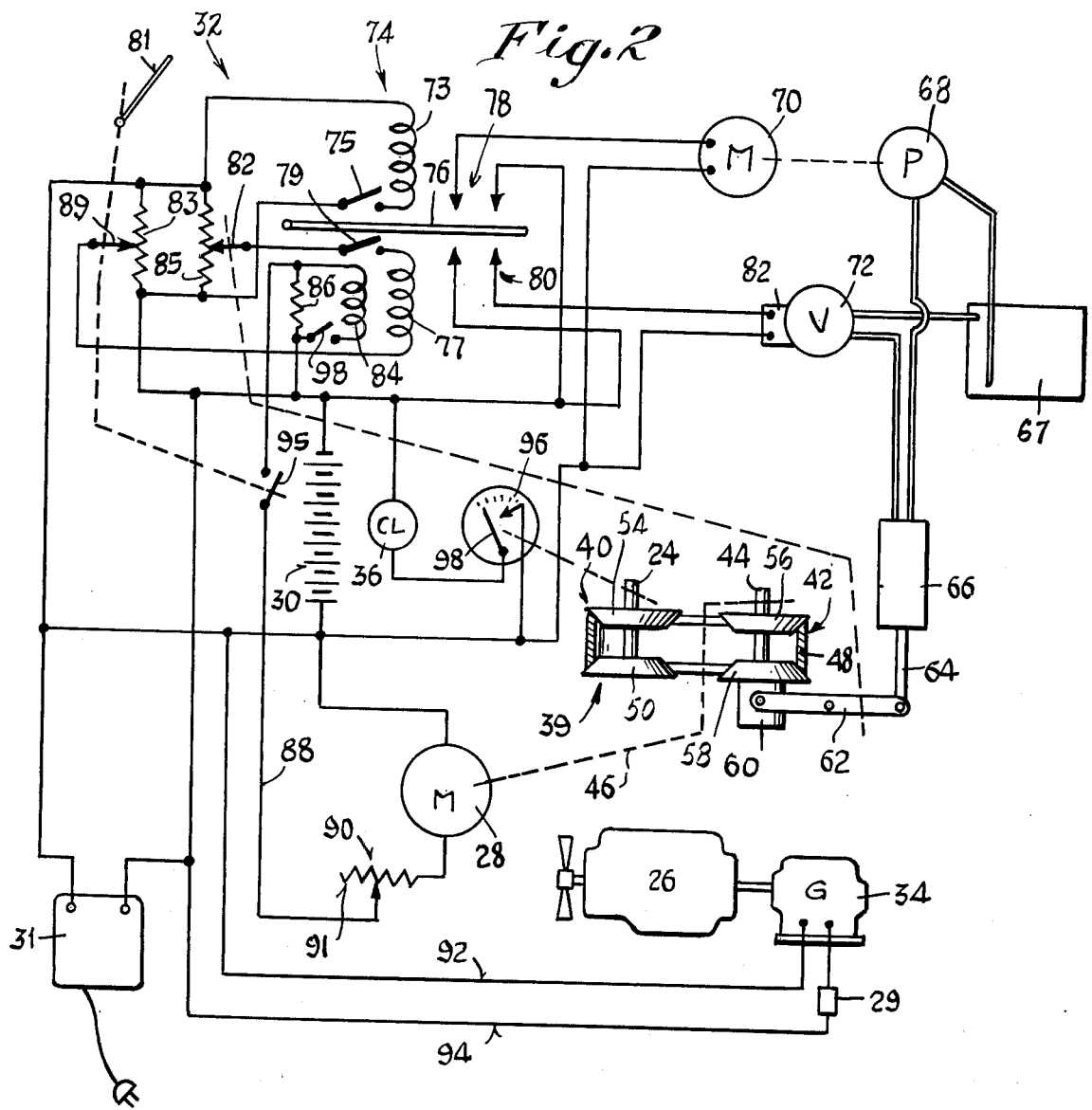
FIG. 2 is a diagrammatic representation of the automatic control devices of the hybrid power system of FIG. 1.

Changes in the ratio of the transmission 39 can be either effected at will by the driver of the vehicle, or else can be done automatically in response to changes in the value of the current drawn by the motor 28, which in turn reflects changes in the speed of the vehicle. As to the latter, this is accomplished, see FIG. 2, by means of a heavy-duty control relay 74 in the motor circuit, having a polarized armature 76 which can be biased by a servo-circuit later described, said armature being cooperable with pairs of electrical contacts 78, 80. The contacts 78 control the energization of the pump motor 70, and the contacts 80 control the bleeder valve 72 which is operated by a solenoid 82. When the relay armature 76 is magnetically biased as later described, and centralized as illustrated in FIG. 2 the transmission 39 remains in a given ratio which could, for example, be a ratio of one-to-one or thereabouts. When the relay armature 76 is engaged with the contacts 78 the hydraulic cylinder 66 is activated and alters the ratio of the transmission 39 in a manner that the effective diameter of the pulley set 42 increases. This is accompanied by a decrease in the effective diameter of the pulley set 40, resulting in a ratio which gives a faster speed of the vehicle wheels 20 with respect to the electric motor 28. Conversely, when the relay armature 76 disengages the contacts 78 and instead engages the contacts 80, the bleeder valve 72 will be open and the transmission spring 52 will shift the pulley set 40 to increase its effective diameter, while the pulley set 42 accommodates itself with a decrease in its effective diameter. This results in a ratio which now gives a faster speed of the motor 28 with respect to the vehicle wheels 20.

The relay 74 has a coil 84 acting against the bias of the armature 76 and bridged by a heavy shunt 86, and also connected in series with the power circuit 88 for the electric motor 28. In such circuit there is a starting switch 90 which can include a heavy resistor grid 91 or solid state controller. As shown in FIG. 2, the generator 34 is connected by wires 92, 94 to the batteries 30.

Fixed magnetic biasing of the armature 76 can be effected by a coil 73 controlled by a switch 75, or variable biasing effected by a coil 77 and switch 79 of a servo system which latter is operable to give the driver manual or foot control over the transmission.

When the switch 75 is closed, the coil 73 biases the armature against the action of the coil 84, and this effect can be used for the automatic control of the transmission as later described in greater detail.

In accomplishing the foot control of the transmission 39, an accelerator 81 is coupled to the slider of a potentiometer 83 the element of which is energized from the battery 30 and shunted with an element of a potentiometer 85 whose slider 82 is mechanically coupled to the transmission levers 62 and electrically connected to the coil 77. The coil 77 also is electrically connected to the slider 89 of the potentiometer 83.

It will now be seen that shifting of the slider 89 by actuation of the car accelerator 81 will cause energization of the relay coil 77 in a manner to attract or repel the armature 76 and either upshift or downshift the transmission 39 whereby the slider 82 is moved to a point where no voltage occurs across the coil 84 and the armature 76 is centralized. The foregoing pre-supposes that the relay coil 84 is now energized, this being effected by a series switch 98 which, when open, disconnects the coil. Thus a driver-control of the transmission 39 is had. When the car accelerator 81 is in the raised, idling position, it opens a switch 95 in the circuit of the motor 28 whereby the latter remains de-energized for car standstill.

The automatic operation of the transmission 39 of the present improved vehicle power system can now be readily understood. When the car is at a standstill, with the engine 26 shut down, starting is effected by closing the starting switch 90 and gradually cutting out the heavy resistance grid 91 associated therewith. Assume that the switch 98 is closed, to obtain automatic operation. If variable biasing of the armature 76 is to be used, the driver opens switch 75 and closes switch 79. He now depresses the accelerator 81 and holds it fully depressed. Heavy starting current will flow through the relay shunt 86 and coil 84, overcoming the up-shift biasing energization of the servo coil 77 and taking over, thus pulling the armature 76 into engagement with the contacts 80 whereby the bleeder valve opens and the transmission 39 shifts down to low wheel speed, with the heavy starting current confined within reasonable and safe limits. As the car picks up speed, the current in the motor 28 reduces and the relay armature in consequence can centralize under its biasing, thus disengaging the contacts 80, and then thereafter engaging the contacts 78. The pump motor 70 is now energized, and the transmission 39 starts to shift up, providing a higher wheel speed with respect to the motor speed. The speed of the pumping is such that the change in transmission ratio is gradual and relates to a normal acceleration of the car whereby cruising speed can be obtained on level surfaces. If the car is facing uphill, or encounters a hill prior to attainment of cruising speed, the heavier motor current could either maintain the relay armature engaged with the contacts 80 or pull it again into engagement with said contacts. In the latter case the transmission 39 will automatically downshift due to opening of the bleeder valve 72 and action of the spring 52. Insertion of more of the resistance grid 91 to slow the motor 28 either could, or else would not operate the relay 74 and transmission 39 depending on the value of the motor current in the shunt 86. Thus the current drawn by the motor 28, as it varies, changes the ratio of the transmission 39. As the car speeds up, the motor current lessens and the transmission shifts up, and vice versa. In cases where the battery charge is lower than ¼, a battery float monitor switch 97 in the ignition circuit (including coil 99 and distributor 101) of the engine 26 closes so that the engine is in readiness for operation. When or shortly before cruising speed is attained, the engine 26 can now be started, and a tachometer 96 can automatically effect coupling of the engine to the front vehicle wheels by means of the magnetic clutch, relieving load on the motor 28. The relay armature 76 will now remain engaged with the contacts 78, thus maintaining the transmission 39 in its "high" setting, where the rear wheels 20 have the highest speed with respect to the motor 28. A small standby current could be maintained through the motor 28 by the grid 91, but the charging of the batteries 30 by the generator 34 would be much greater than this, whereby the batteries would be charging.

The biasing of the relay armature 76 by the servo coil 77 varies as the ratio of the transmission 39 changes, as will now be understood. If, instead, a constant bias of the armature 76 is to be had, the switch 79 is opened and the switch 75 closed, whereby the coil 73 opposes the coil 84. For such operation the accelerator 81 need not be held depressed.

With the present arrangement of gasoline and electric drive there is assurance that the car will always have enough power to return from a trip, providing that gasoline is not exhausted. Advantages are also had due to the capability of dynamic braking, using the motor 28.

The possibility exists of all-electric operation, operation on gasoline alone, or dual operation as a 4-wheel drive vehicle, and electric operation where the generator is charging the battery and energizing the motor, with or without wheel drive from the internal combustion unit.

The invention further provides means for usefully utilizing the fumes given off by the batteries when they are being recharged during the travel of the vehicle. As shown in FIG. 1, manifolds 110 connected to a multiplicity of small tubes 111, one for each battery cell, collect the battery fumes and bring these to a neutralizing tank 112 which can contain acid-reacting means to neutralize the acid fumes from the charging batteries. The neutralized mixture, which may comprise hydrogen and oxygen, is then introduced into the carburetor 114 of the engine 26 by means of a conduit 116 and as a consequence of the suction of the engine intake. The neutralized fumes then burn harmlessly in the engine, and assist in making up the normal losses of charging and discharging. A selector valve 113 located ahead of the neutralizing tank 112 can discharge the acid fumes into the atmosphere during stationary charging. Or, a valve 115 located in the conduit 116 can discharge the neutralized fumes into the atmosphere.

The invention provides for an automatic coupling of the internal combustion engine 26 to the front vehicle wheels 12 when a predetermined cruising speed is attained and battery charge is less than half. This can be accomplished by the tachometer 96 coupled to the rear drive shaft 24 and provided with contacts 98 connected with the batteries 30 and the magnetic clutch 36. When the tachometer attains a predetermined deflection its contacts 98 will close, energizing the clutch 36 and connecting the engine 26 to drive the front wheels 12. Energization of the electric motor 28 can now be discontinued, as by opening the starting switch 90 and the switch 98. The accelerator 81 is depressed and the control relay 74 will respond by upward movement of the armature 76 whereby the transmission 39 will automatically become adjusted to a given ratio which can, for example, be the highest, with slow motor speed.

Variations and modifications are possible without departing from the spirit of the invention.

I claim:

1. A hybrid powered automobile, comprising in combination:
   a. a vehicle having wheels,
   b. electric storage batteries,
   c. an internal combustion engine,
   d. an electric generator driven by said engine and connected to charge said batteries,
   e. means including a clutch, providing a drive from the engine to wheels of the vehicle,
   f. an electric drive motor,
   g. means for energizing the drive motor from the batteries,
   h. a variable-ratio mechanical transmission between the drive motor and other wheels of the vehicle, for imparting an electrical drive to the latter, and
   i. automatic power means responsive to variation in the current drawn by, and consequently the loading of, the drive motor for altering the ratio of the mechanical transmission according to the load the vehicle imposes on said motor.

2. An automobile as in claim 1, wherein:
   a. said automatic means includes an electrically operative switch responsive to current drawn by the drive motor.

3. A hybrid powered automobile, comprising in combination:
   a. a vehicle having wheels,
   b. electric storage batteries,
   c. an internal combustion engine,
   d. an electric generator driven by said engine and connected to charge said batteries,
   e. means including a clutch, providing a drive from the engine to wheels of the vehicle,
   f. an electric drive motor,
   g. means for energizing the drive motor from the batteries,
   h. a variable-ratio mechanical transmission between the drive motor and other wheels of the vehicle, for imparting an electrical drive to the latter,
   i. power means for altering the ratio of the mechanical transmission,
   j. means responsive to current drawn by the drive motor, for controlling said power means which alters the transmission ratio,
   k. said mechanical transmission comprising cone pulleys,
   l. said power means comprising a hydraulic cylinder for altering the pulley diameters,
   m. said current-responsive means comprising a relay and an electric-powered pump connected with the cylinder and controlled by said relay.

4. An automobile as in claim 3, wherein:
   a. said power means includes an electric bleeder valve connected with the cylinder and controlled by said relay.

5. An automobile as in claim 4, wherein:
   a. the relay has a null position which neither energizes the pump or the bleeder valve.

6. A hybrid powered automobile, comprising in combination:
   a. a vehicle having wheels,
   b. electric storage batteries,
   c. an internal combustion engine having an ignition circuit,
   d. an electric generator driven by said engine and connected to charge said batteries,
   e. means including a clutch, providing a drive from the engine to wheels of the vehicle,
   f. an electric drive motor,
   g. means for energizing the drive motor from the batteries,
   h. a variable-ratio mechanical transmission between the drive motor and other wheels of the vehicle, for imparting an electrical drive to the latter,
   i. means responsive to changes in the electrolyte of the storage batteries, for switching the ignition circuit of the internal combustion engine to control the operation thereof,
   j. said means for switching the engine ignition circuit including a float switch carried by one of the batteries and immersed in the electrolyte thereof.

* * * * *